United States Patent [19]
Mori

[11] Patent Number: 5,631,777
[45] Date of Patent: May 20, 1997

[54] PHOTOGRAPHING LENS FOR LENS-FITTED FILM UNIT OR FIXED FOCUS LENS CAMERA

[75] Inventor: Nobuyoshi Mori, Hachioji, Japan

[73] Assignee: Konica Corporation, Tokyo, Japan

[21] Appl. No.: 457,129

[22] Filed: Jun. 1, 1995

[30] Foreign Application Priority Data

Jun. 6, 1994 [JP] Japan .................................. 6-123932

[51] Int. Cl.$^6$ .............................. G02B 3/02; G02B 9/06
[52] U.S. Cl. .............................. 359/717; 359/794
[58] Field of Search .............................. 359/717, 716, 359/715, 794

[56] References Cited

U.S. PATENT DOCUMENTS

| | | | |
|---|---|---|---|
| 5,000,552 | 3/1991 | Simpson, Jr. et al. | 359/794 |
| 5,166,830 | 11/1992 | Ishibai et al. | 359/717 |
| 5,327,291 | 7/1994 | Baker et al. | 359/716 |
| 5,483,381 | 1/1996 | Baba | 359/717 |

FOREIGN PATENT DOCUMENTS

| | | |
|---|---|---|
| 63-199351 | 8/1988 | Japan . |
| 1-307712 | 12/1989 | Japan . |
| 2-106710 | 4/1990 | Japan . |
| 4-211215 | 8/1992 | Japan . |
| 5-281465 | 10/1993 | Japan . |

*Primary Examiner*—Scott J. Sugarman
*Assistant Examiner*—Jordan M. Schwartz
*Attorney, Agent, or Firm*—Finnegan, Henderson, Farabow, Garrett & Dunner, L.L.P.

[57] ABSTRACT

A photographic lens includes a first meniscus lens having a positive refracting power, a convex face of which is directed to a photographic object side, and includes a second meniscus lens having a positive refracting power, a concave face of which is directed to the photographic object side. The first and second lenses are arranged in this order from the photographic object side. The photographic lens is composed in such a manner that the following conditional expressions are satisfied:

$$0.60 < f/f_1 < 0.75$$

$$-3.2 < (r_4 + r_3)/(r_4 - r_3) < -2.5$$

where $f$ represents a focal length of the photographic lens, $f_1$ represents a focal length of the first meniscus lens, $r_3$ represents a radius of curvature of the concave surface facing the object side of the second meniscus lens and $r_4$ represents a radius of curvature of a surface facing an image plane side of the second meniscus lens.

9 Claims, 8 Drawing Sheets

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

PHOTOGRAPHING LENS FOR LENS-FITTED FILM UNIT OR FIXED FOCUS LENS CAMERA

BACKGROUND OF THE INVENTION

The present invention relates to a photographing lens used for a lens-fitted film unit or a fixed focus camera.

Recently, lens-fitted film units have come into wide use because they function as handy inexpensive cameras. There is a demand for more handy cameras, the image quality of which is high. Conventional examples of a lens-fitted film unit composed of a single lens are disclosed in Japanese Patent Publication Open to Public Inspection Nos. 199351/1988 and 106710/1990. Conventional examples of a lens-fitted film unit composed of two lenses are disclosed in Japanese Patent Publication Open to Public Inspection Nos. 307712/1989, 211215/1992 and 281465/1993.

The above conventional examples of a lens-fitted film unit composed of a single lens are disadvantageous in that: it is impossible to correct lateral chromatic aberration so that the color bleeding is remarkable in the periphery of the image plane and further distortion is increased. When a distance from the lens to the film surface is shortened so as to reduce the thickness of the camera, image quality is remarkably affected by the aberration.

According to the structure including two lenses disclosed in Japanese Patent Publication Open to Public Inspection No. 307712/1989, a positive and a negative lens are combined so as to correct lateral chromatic aberration, however, distortion is remarkable. According to the structure including two lenses disclosed in Japanese Patent Publication Open to Public Inspection No. 211215/1992, two positive meniscus lenses of Hypergon are arranged on both sides of a diaphragm substantially symmetrically to each other, so that it is easy to correct lateral chromatic aberration and distortion, however, the telephoto ratio is high. Accordingly, unless the focal length is shortened, the entire lens length is increased, so that the thickness of a lens-fitted film unit is increased.

The entire length of the lens disclosed in Japanese Patent Publication Open to Public Inspection No. 281465/1993 is shorter than that disclosed in Japanese Patent Publication Open to Public Inspection No. 211215/1992. However, the lens disclosed in Japanese Patent Publication Open to Public Inspection No. 281465/1993 has been subjected to correction of lateral chromatic aberration for panoramic printing. Accordingly, a barrel-shaped distortion remains, so that a long side of the image plane is distorted into a barrel shape.

SUMMARY OF THE INVENTION

An object of the present invention is to provide a photographic lens suitable for a lens-fitted film unit or fixed-focus lens camera. The entire lens length of the lens is relatively short, and lateral chromatic aberration and distortion are completely corrected in the lens.

The lens of the present invention includes a first lens having a positive refracting power, a meniscus-shape configuration, and a convex face directed toward the photographic object side, and also includes a second lens having a positive refracting power, a meniscus-shape configuration, and a concave face directed toward the photographic object side, wherein the first and second lenses are arranged in this order from the photographic object side. This lens is composed in such a manner that the following conditional expressions can be satisfied.

$$0.50 < f/f_1 < 0.90 \quad (1)$$

$$-8 < (r_4+r_3)/(r_4-r_3) < -1.5 \quad (2)$$

where a focal length of the entire lens system is $f$, a focal length of the first lens is $f_1$, a radius of curvature of the second lens on the photographic object side is $r_3$, and a radius of curvature on the image side is $r_4$.

Instead of the conditional expressions (1) and (2), the following conditional expressions (3) and (4) may be used. In this case, it is possible to provide better results.

$$0.6 < f/f_1 < 0.85 \quad (3)$$

$$-3.5 < (r_4+r_3)/(r_4-r_3) < -1.7 \quad (4)$$

Instead of the conditional expressions (3) and (4), the following conditional expressions (5) and (6) may be used. In this case, it is possible to provide better results.

$$0.6 < f/f_1 < 0.75 \quad (5)$$

$$-3.2 < (r_4+r_3)/(r_4-r_3) < -2.5 \quad (6)$$

Also, the lens of the present invention includes a first lens having a positive refracting power, a meniscus-shape configuration, and a convex face directed toward the photographic object side, and also includes a second lens having a positive refracting power, a meniscus-shape configuration, and a concave face directed toward the photographic object side, wherein the longitudinal direction of the photographic image plane is curved toward the lens as it approaches the periphery from the optical axis. This lens is composed in such a manner that the following conditional expressions can be satisfied.

$$0.24 < f/f_1 < 0.90 \quad (7)$$

$$-8 < (r_4+r_3)/(r_4-r_3) < -0.5 \quad (8)$$

In the above two types of configurations, at least one of the faces of the first lens is aspherical and has a reduced refracting power as it approaches the lens periphery from the optical axis. Due to the above composition, it is possible to provide more excellent effects.

Further, when the following conditional expressions are satisfied, it is possible to provide better results.

$$0.002 < (r_1 \cdot d_1)/(f \cdot f_1) < 0.008 \quad (9)$$

$$v_1 > 55 \quad (10)$$

where a paraxial radius of curvature on the face of the photographic object side of the first lens is $r_1$, a thickness on the axis is $d_1$, and Abbe's Number is $v_1$.

When the conditional expression (11) is used instead of the conditional expression (9), it is possible to provide better results.

$$0.003 < (r_1 \cdot d_1)/(f \cdot f_1) < 0.004 \quad (11)$$

In all lens configurations described above, it is preferable that a diaphragm is arranged at the rear of the second lens, and also it is preferable that the diaphragm is arranged at a position as close as possible to the second lens.

The lens according to the present invention is suitable for a lens-fitted film unit or a fixed-focus lens camera. That is, the lens according to the present invention is a wide angle lens, the F-number of which is large and the focal length of which is short. According to the lens of the present invention, when the following conditional expressions are satisfied, excellent results are provided.

$$f^2/F<120 \tag{12}$$

$$0.5<Y_{MAX}/f<0.87 \tag{13}$$

where the maximum image height is $Y_{MAX}$ which is equal to a half of the length of the diagonal line on the image plane.

When the positive refracting power is distributed to two lenses, it is possible to reduce lateral chromatic aberration. In other words, when the two lenses are configured in the following manner, aberration can be completely corrected. The two lenses include: the first lens, the configuration of which is a positive meniscus shape, the convex face of which is directed to the photographic object side; and the second lens, the configuration of which is a positive meniscus shape, the concave face of which is directed to the photographic object side, wherein the first and second lenses are arranged in this order from the photographic object side. Due to the foregoing composition, lateral chromatic aberration can be more completely corrected by the divergence effect of the luminous flux on the concave faces of the first and second lenses. The lower the refracting power distributed to the first lens is, the lower the lateral chromatic aberration is reduced, and at the same time the positive distortion is reduced.

However, when the refracting power of the first lens is reduced, there is a tendency that positive astigmatism is increased. When the second lens is composed of a positive meniscus lens, the concave face of which is directed to the photogrpahic object side, negative astigmatism is generated to cancel it.

By the conditional expressions (1) and (2), the aforementioned lateral chromatic aberration, distortion and astigmatism are well-balanced. When it exceeds the upper limit of the conditional expression (1), positive distortion and lateral chromatic aberration increase, which is not preferable. When it exceeds the lower limit of the conditional expression (1), astigmatism increases, and the meridional image face is greatly curved onto the lens side, that is, the condition becomes "under corrected" and further negative lateral chromatic aberration is generated. As used herein, the phrase "under corrected" means that astigmatism is increased.

On the other hand, when it exceeds the upper limit of the conditional expression (2), a component of negative astigmatism generated in the second lens is reduced, and astigmatism of the entire lens system is increased, and the meridional image surface is put into the "under corrected" condition When it is below the lower limit of the conditional expression (2), astigmatism remains in the entire lens system.

When the conditional expressions (3) and (4) are used instead of the conditional expressions (1) and (2), it is possible to provide better quality. When the conditional expressions (5) and (6) are used, lateral chromatic aberration, distortion and astigmatism are well-balanced, and the astigmatism is put into an optimum condition.

When the photographing image plane is curved toward the lens, it is possible to provide excellent image quality even though the image plane of the entire lens system is in the "under corrected" condition. As disclosed in the present invention, when the longitudinal direction of the photographing image plane is curved toward the lens side as it comes from the optical axis to the periphery of the image plane, better results can be provided, and astigmatism is reduced and the image plane of the entire lens system becomes equal to the Petzval image plane, and an excellent image can be provided even though the image plane is put into the "under corrected" condition.

According to the conditional expressions (7) and (8), the upper and lower limits are extended to be wider than those of the conditional expressions (1) and (2). The reason is described as follows. As described before, even though the image plane is put into the "under corrected" condition, an excellent image can be provided when the photographing image plane is curved.

An aspherical lens is used for the first lens, so that the refracting power of the first lens is reduced at a position distant from the optical axis of the lens. That is, when an aspherical surface is used on the photographic object side, the radius of curvature increases as it extends from the optical axis. When an concave surface is used on the photographic object side, the radius of curvature decreases as it extends from the optical axis. Due to the foregoing, image plane curvature in the "under corrected" condition can be improved.

When the paraxial radius $r_1$ of curvature of the first lens on the photographic object side and the thickness $d_1$ on the optical axis are determined so that the conditional expression (9) can be satisfied, distortion, lateral chromatic aberration and curvature on the image plane can be appropriately corrected. When it exceeds the upper limit of the conditional expression (9), positive distortion and lateral chromatic aberration are increased, which is not preferable. When it exceeds the lower limit of the conditional expression (9), the image plane is put into a condition of being excessively "under corrected", which is not preferable.

When the conditional expression (11) is used instead of the conditional expression (9), it is possible to provide an image on which lateral chromatic aberration and distortion are well-balanced.

Abbe's number $v_1$ of glass of the first lens relates to lateral chromatic aberration. When it exceeds the lower limit of the conditional expression (10), lateral chromatic expression is extremely increased.

The conditional expression (12) expresses a condition in which a lens is focused on a photographic object located at an infinite distance and also focused on a photographic object located at a short distance when the lens is used for a fixed-focus camera. When it exceeds the upper limit of the conditional expression (12), the focal depth is decreased to be short. Therefore, it becomes difficult to use the lens for a fixed-focus camera.

The conditional expression (13) expresses a condition in which the angle of view is determined. When it exceeds the upper limit of the conditional expression (13), the angle of view is extremely increased, and lateral chromatic aberration and distortion become remarkable even though the conditions of the present invention are satisfied. Therefore, it is not preferable. When it exceeds the lower limit of the conditional expression (13), the angle of view is reduced, which is not suitable for taking a souvenir photograph or a snap photograph. Further, when it exceeds the lower limit of the conditional expression (13), a camera-shake tends to occur.

DETAILED DESCRIPTION OF THE PREFERRED EMBODIMENTS

With reference to FIGS. 1 to 9(D), four examples of the present invention will be explained in detail.

Figure 1:
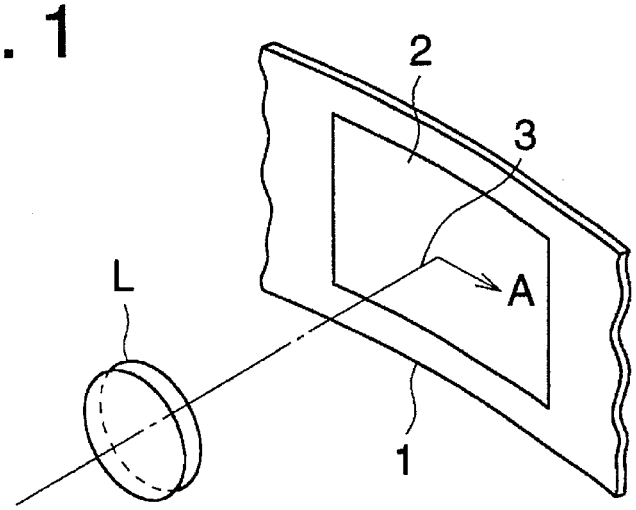
FIG. 1 is a schematic illustration showing a relation between the lens of example and the image plane.

FIG. 1 is a schematic illustration showing a relation between the lens of example and the image plane. In FIG. 1, character L is a photographic lens, numeral 1 is photographic film, numeral 2 is a photographing image plane, numeral 4 is a first lens, numeral 5 is a second lens, and character D is a diaphragm of lens L. The photographing image plane 2 is formed in a rectangular shape, the long side of which is located in the direction of A. The image plane 2 is curved toward the photographic lens L as it extends from the center 3 of the optical axis to the periphery in the direction of A.

It is possible to apply the lenses described in the following first, second and third examples to a flat photographing image plane, however, it is preferable that the photographing image plane is curved. The fourth example is made on the assumption that the photographing image plane is curved.

Reference characters in each example are defined as follows.

f: focal length

F: F-number

ω: half angle of view r: radius of curvature of refracting surface d: interval between refracting surfaces nd: refractive index of lens material vd: Abbe's number of lens material When the X-axis is established in the optical axis direction and the Y-axis is established in the direction perpendicular to the optical axis, the aspherical surface of the present invention can be expressed by the expression 1 described later. In this connection, mark * is attached at a position before the lens number of the aspherical surface.

$$X = \frac{Y^2/r}{1 + \sqrt{1-(1+K)Y^2/r^2}} + \sum_{i=2}^{\infty} A_{2i}Y^{2i}$$  [Expression 1]

where r is a paraxial radius of curvature, and K and $A_{2i}$ are coefficients of an aspherical surface.

[FIRST EXAMPLE]

Dimensions of the lens of this example are described as follows.

f=29.28, F=9.70, and ω=37.3°

Figure 2:
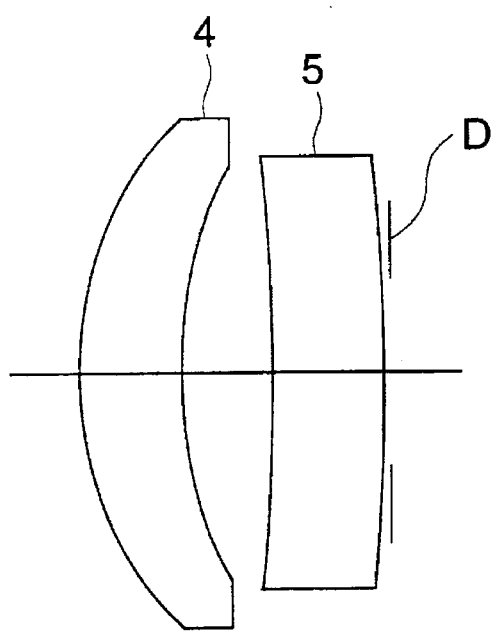
FIG. 2 is a view showing the configuration of the lens of the first example.
Figure 3:
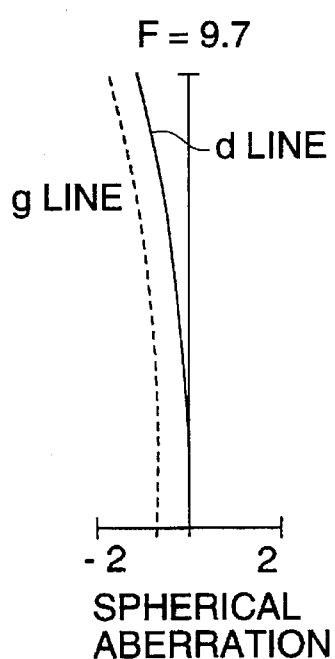
FIGS. 3(A) to 3(D) are diagrams showing the aberration of the first example.
Figure 3:
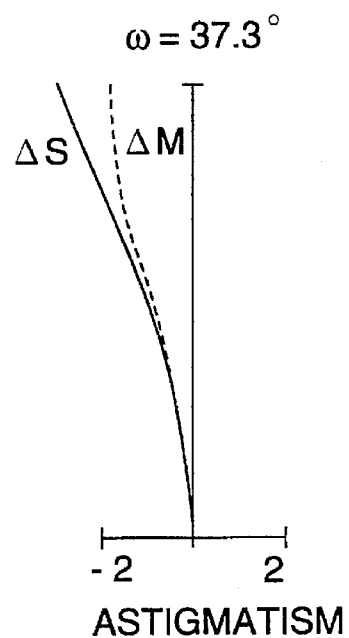
Figure 3:
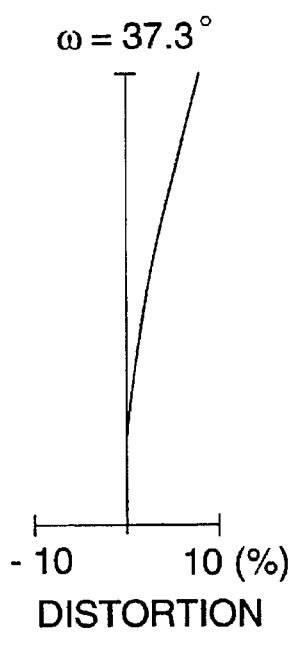
Figure 3:
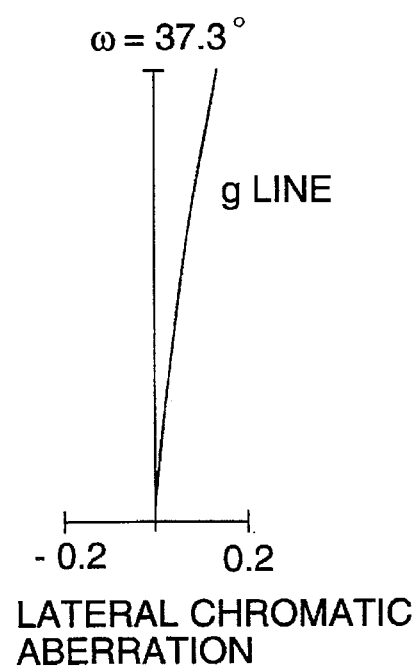

The configuration of the lens is shown in FIG. 2. Numeral 4 is the first lens, numeral 5 is the second lens, and character D is a diaphragm of the lens L. The lens data is shown below.

TABLE 1

| Surface No. | r | d | nd | vd |
|---|---|---|---|---|
| *1 | 5.195 | 1.50 | 1.492 | 57 |
| 2 | 6.756 | 1.20 | | |
| 3 | −63.412 | 1.70 | 1.492 | 57 |
| 4 | −34.397 | 0.10 | | |
| 5 | (diaphragm) | | | |

| Coefficient of aspherical surface of the first surface |
|---|
| K = −0.07133 |
| $A_4 = -0.88187 \times 10^{-4}$ |
| $A_6 = 0.30656 \times 10^{-4}$ |
| $A_8 = -0.24086 \times 10^{-5}$ |
| $A_{10} = 0.57619 \times 10^{-7}$ |

Due to the foregoing, the following can be provided.

$f/f_1 = 0.844$ $(r_4+r_3)/(r_4-r_3) = -3.37$ $(r_1 \cdot d_1)/(f \cdot f_1) = 0.0075$ Telephoto ratio=1.00

FIGS. 3(A) to 3(D) are aberration diagrams of this lens.

[SECOND EXAMPLE]

Dimensions of the lens of this example are described as follows.

f=29.40, F=9.70, and ω=37.9°

Figure 4:
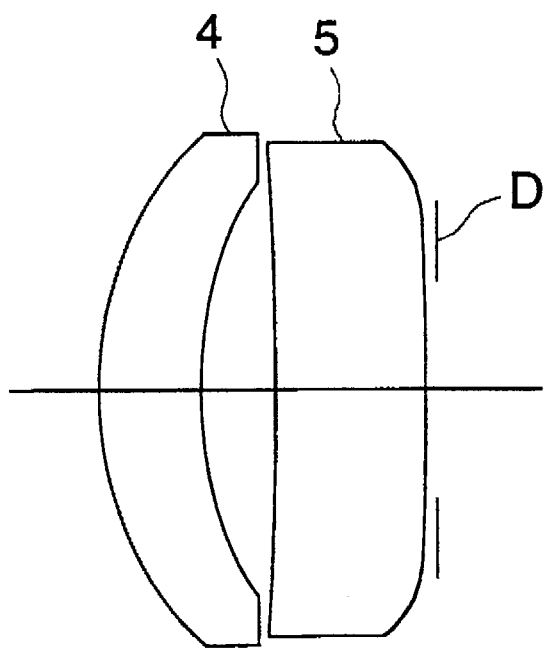
FIG. 4 is a view showing the configuration of the lens of the second example.
Figure 5:
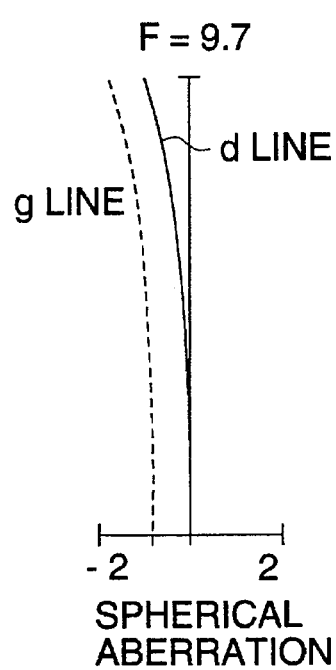
FIGS. 5(A) to 5(D) are diagrams showing the aberration of the second example.
Figure 5:
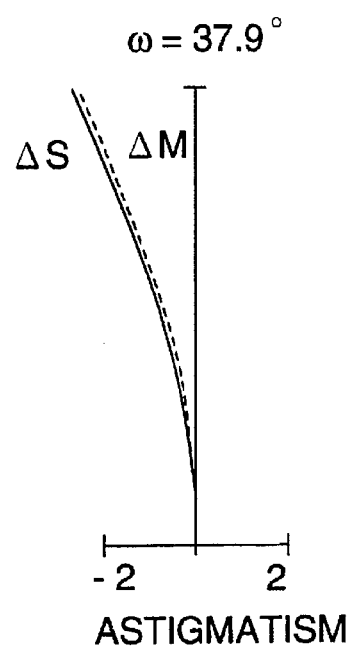
Figure 5:
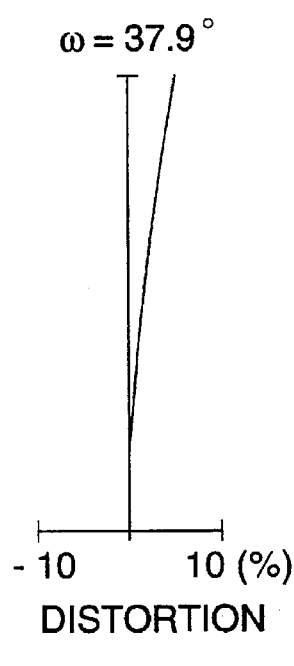
Figure 5:
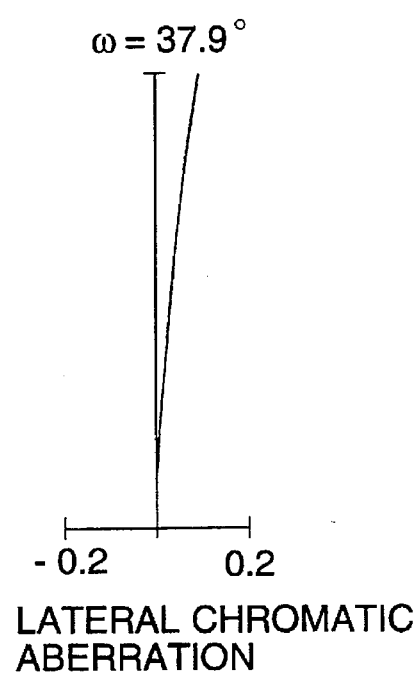

The configuration of the lens is shown in FIG. 4. Numeral 4 is the first lens, numeral 5 is the second lens, and character D is a diaphragm of the lens L. The lens data is shown below.

TABLE 2

| Surface No. | r | d | nd | vd |
|---|---|---|---|---|
| *1 | 4.660 | 1.25 | 1.492 | 57 |
| 2 | 5.520 | 0.80 | | |
| 3 | −47.710 | 1.89 | 1.583 | 30 |
| *4 | −24.784 | 0.10 | | |
| 5 | (diaphragm) | | | |

| Coefficient of aspherical surface of the first surface | Coefficient of aspherical surface of the fourth surface |
|---|---|
| K = −0.39662 | $K = 0.51122 \times 10^{-4}$ |
| $A_4 = 0.15614 \times 10^{-3}$ | $A_4 = 0.42223 \times 10^{-4}$ |
| $A_6 = 0.92268 \times 10^{-4}$ | $A_6 = 0.42695 \times 10^{-4}$ |
| $A_8 = -0.10085 \times 10^{-4}$ | $A_8 = 0.56878 \times 10^{-5}$ |
| $A_{10} = 0.44547 \times 10^{-6}$ | $A_{10} = -0.77589 \times 10^{-5}$ |

Due to the foregoing, the following can be provided.

$f/f_1 = 0.71$ $(r_4+r_3)/(r_4-r_3) = -3.16$ $(r_1 \cdot d_1)/(f \cdot f_1) = 0.0048$ Telephoto ratio=1.01

FIGS. 5(A) to 5(D) are aberration diagrams of this lens.

[THIRD EXAMPLE]

Dimensions of the lens of this example are described as follows.

f=30.35, F=9.20, and ω=36.1°

Figure 6:
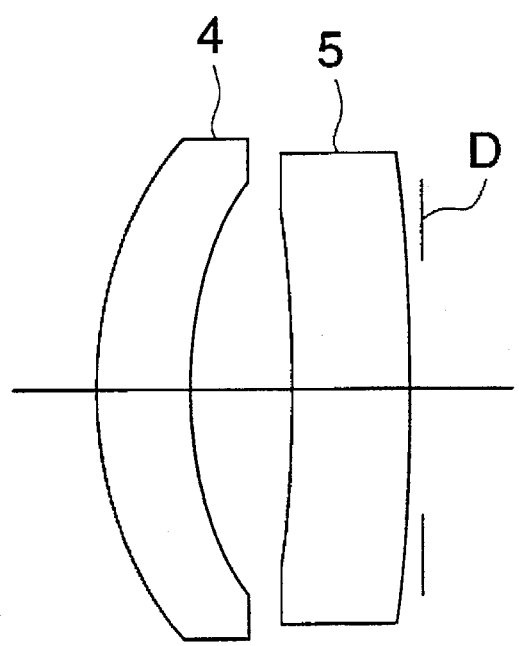
FIG. 6 is a view showing the configuration of the lens of the third example.
Figure 7:
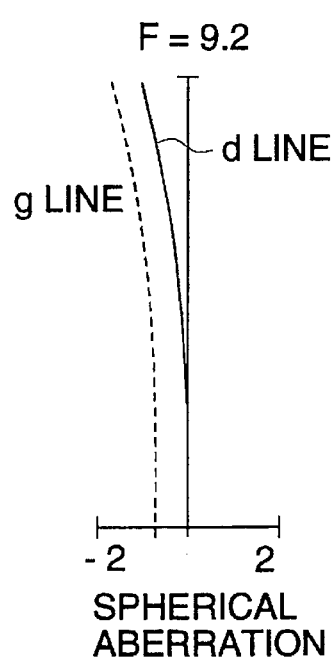
FIGS. 7(A) to 7(D) are diagrams showing the aberration of the third example.
Figure 7:
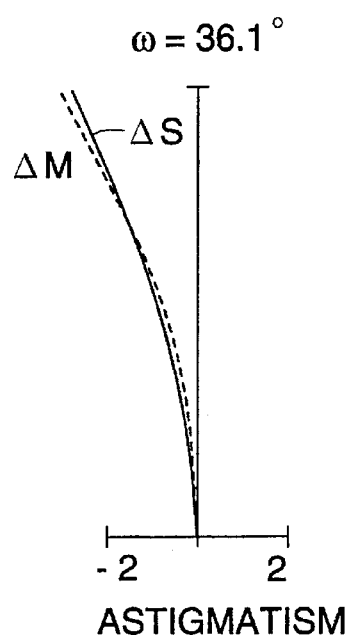
Figure 7:
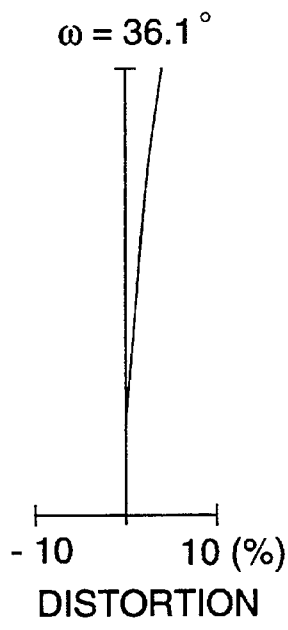
Figure 7:
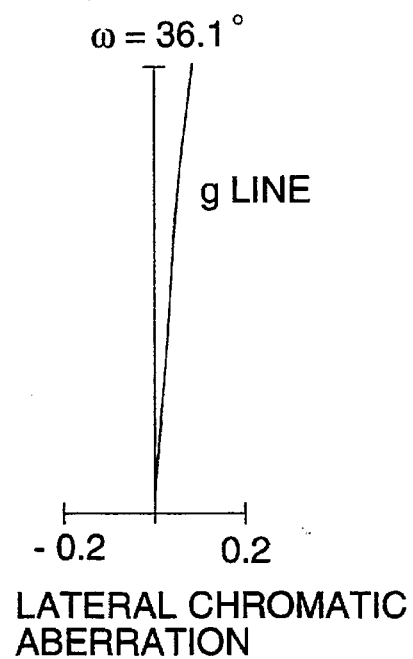

The configuration of the lens is shown in FIG. 6. Numeral 4 is the first lens, numeral 5 is the second lens, and character D is a diaphragm of the lens L. The lens data is shown below.

TABLE 3

| Surface No. | r | d | nd | vd |
|---|---|---|---|---|
| *1 | 4.785 | 1.20 | 1.492 | 57 |
| 2 | 5.492 | 1.10 | | |
| 3 | −42.166 | 1.50 | 1.492 | 57 |
| 4 | −19.132 | 0.10 | | |
| 5 | (diaphragm) | | | |

| Coefficient of aspherical surface of the first surface |
|---|
| K = −0.58342 |
| $A_4 = 0.29454 \times 10^{-3}$ |
| $A_6 = 0.76304 \times 10^{-4}$ |
| $A_8 = 0.74335 \times 10^{-5}$ |
| $A_{10} = 0.24943 \times 10^{-6}$ |

Due to the foregoing, the following can be provided.

$f/f_1 = 0.63$ $(r_4+r_3)/(r_4-r_3) = -2.66$ $(r_1 \cdot d_1)/(f \cdot f_1) = 0.0039$ Telephoto ratio=0.99

FIGS. 7(A) to 7(D) are aberration diagrams of this lens.

[FOURTH EXAMPLE]

Dimensions of the lens of this example are described as follows.

f=29.48, F=9.70, and ω=38.0°

Figure 8:
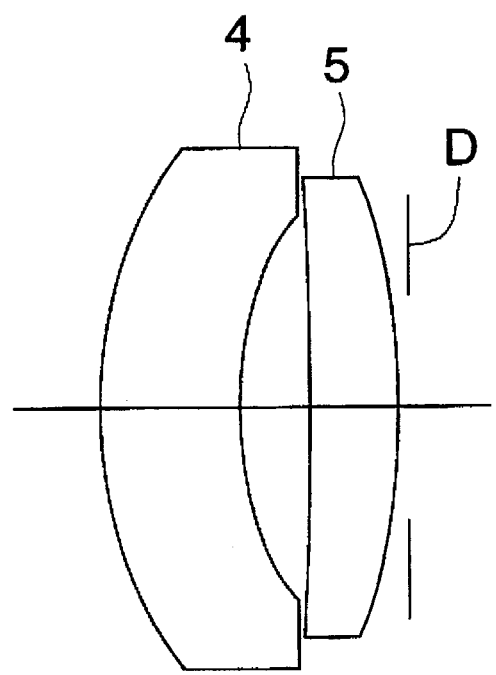
FIG. 8 is a view showing the configuration of the lens of the fourth example.
Figure 9:
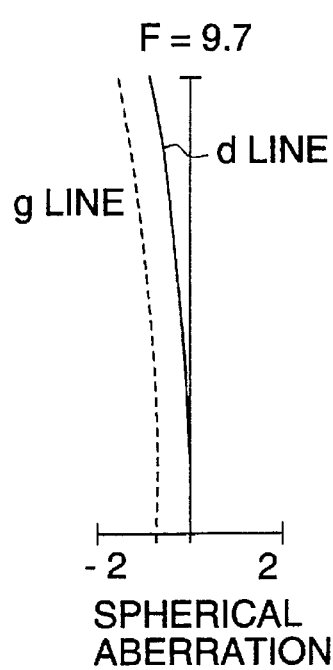
FIGS. 9(A) to 9(D) are diagrams showing the aberration of the fourth example.
Figure 9:
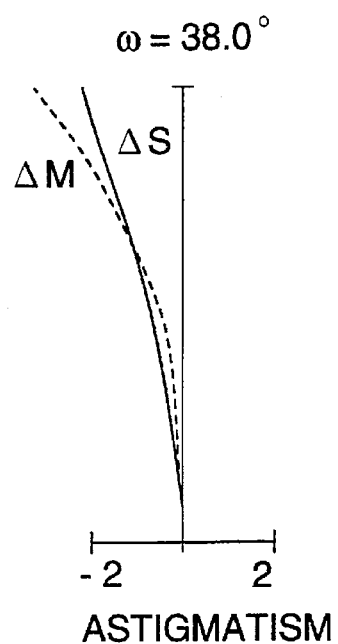
Figure 9:
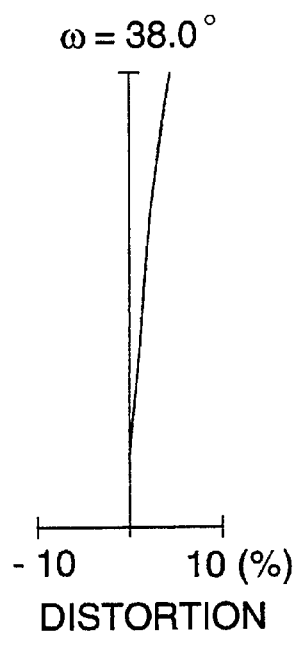
Figure 9:
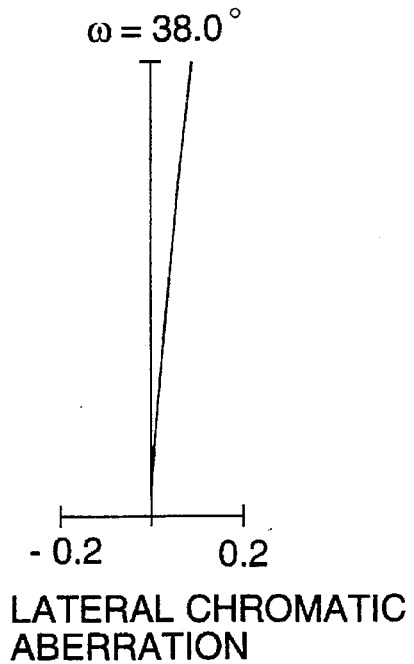

The configuration of the lens is shown in FIG. 8. Numeral 4 is the first lens, numeral 5 is the second lens, and character D is a diaphragm of the lens L. The lens data is shown below.

In this connection, the photographing image plane is a cylindrical surface, the radius of which is 110 mm, and the cylindrical surface is curved along the long side of the photographing image plane.

TABLE 4

| Surface No. | r | d | nd | vd |
|---|---|---|---|---|
| *1 | 5.045 | 1.76 | 1.492 | 57 |
| 2 | 4.886 | 0.80 | | |
| 3 | −42.743 | 1.08 | 1.492 | 57 |
| *4 | −12.139 | 0.10 | | |
| 5 | (diaphragm) | | | |

| Coefficient of aspherical surface of the first surface | Coefficient of aspherical surface of the fourth surface |
|---|---|
| K = −0.48580 | $K = -0.53080 \times 10^{-3}$ |
| $A_4 = -0.22692 \times 10^{-3}$ | $A_4 = -0.10686 \times 10^{-2}$ |
| $A_6 = 0.58355 \times 10^{-4}$ | $A_6 = 0.15852 \times 10^{-3}$ |
| $A_8 = -0.98693 \times 10^{-5}$ | $A_8 = -0.4121 \times 10^{-4}$ |
| $A_{10} = 0.22458 \times 10^{-6}$ | $A_{10} = -0.66365 \times 10^{-6}$ |

Due to the foregoing, the following can be provided.

$f/f_1 = 0.25$ $(r_4+r_3)/(r_4-r_3) = -1.79$ $(r_1 \cdot d_1)/(f \cdot f_1) = 0.0025$ Telephoto ratio=1.00

FIGS. 9(A) to 9(D) are aberration diagrams of this lens.

According to the present invention, the following effects can be provided. Although the photographic lens is simply composed of two positive lenses, as can be seen from the examples, the telephoto ratio is approximately 1 so that the entire lens length is not long, and distortion and lateral chromatic aberration can be corrected in a good condition, and also coma and astigmatism can be sufficiently corrected.

Accordingly, it is possible to provide a photographing lens by which an image of high quality can be formed, and image quality is high on all the image plane from the center to the periphery. Therefore, even if the enlarging magnification is increased, a print of high image quality can be provided.

Accordingly, it is possible to apply the photographing lens of the present invention to a lens-fitted film unit of the full size of 35 mm, and it is also possible to apply the photographing lens of the present invention to an ordinary camera. Further, it is possible to apply the photographing lens of the present invention to a camera having a trimming panoramic function at low cost.

What is claimed is:

1. A photographic lens for use in a camera having an image plane, the photographic lens comprising:

(a) a first meniscus lens having a positive refracting power and a convex surface facing an object side of the photographic lens; and (b) a second meniscus lens having a positive refracting power and a concave surface facing the object side of the photographic lens, the second meniscus lens being farther from the object side of the photographic lens than the first meniscus lens, wherein the following conditions are satisfied:

$0.60 < f/f_1 < 0.85$ $-3.5 < (r_4+r_3)/(r_4-r_3) < -1.7$ and wherein f represents a focal length of the photographic lens, $f_1$ represents a focal length of the first meniscus lens, $r_3$ represents a radius of curvature of said concave surface of the second meniscus lens, and $r_4$ represents a radius of curvature of a surface of the second meniscus lens facing an image plane side of the photographic lens.

2. The photographic lens of claim 1, wherein the following conditions are satisfied:

$0.002 < (r_1 \cdot d_1)/(f \cdot f_1) < 0.008$ $v_1 > 55$ and wherein $r_1$ represents a paraxial radius of curvature of said convex surface of the first meniscus lens, $d_1$ represents a thickness of the first meniscus lens along an optical axis of the photographic lens, and $v_1$ represents an Abbe's number of the first meniscus lens.

3. A photographic lens for use in a camera having an image plane, the photographic lens comprising:

(a) a first meniscus lens having a positive refracting power and a convex surface facing an object side of the photographic lens; and (b) a second meniscus lens having a positive refracting power and a concave surface facing the object side of the photographic lens, the second meniscus lens being farther from the object side of the photographic lens than the first meniscus lens, wherein the following conditions are satisfied:

$0.60 < f/f_1 < 0.75$ $-3.2 < (r_4+r_3)/(r_4-r_3) < -2.5$ and wherein f represents a focal length of the photographic lens, $f_1$ represents a focal length of the first meniscus lens, $r_3$ represents a radius of curvature of said concave surface of the second meniscus lens, and $r_4$ represents a radius of curvature of a surface of the second meniscus lens facing an image plane side of the photographic lens.

4. A photographic lens for use in a camera including an image plane having a surface curved so that the image plane approaches an object side of the photographic lens as the image plane extends in a longitudinal direction from an optical axis of the photographic lens, the photographic lens comprising:

(a) a first meniscus lens having a positive refracting power and a convex surface facing the object side of the photographic lens, wherein at least one surface of said first meniscus lens is aspherical and has a decreasing refracting power as the aspherical surface extends from an optical axis of the photographic lens; and (b) a second meniscus lens having a positive refracting power and a concave surface facing the object side of the photographic lens, the second meniscus lens being farther from the object side of the photographic lens than the first meniscus lens, wherein the following conditions are satisfied:

$0.50 < f/f_1 < 0.90$ $-8 < (r_4+r_3)/(r_4-r_3) < -0.5$ $0.003 < (r_1 \cdot d_1)/(f \cdot f_1) < 0.004$ $v_1 > 55$ and wherein f represents a focal length of the photographic lens, $f_1$ represents a focal length of the first meniscus lens, $r_3$ represents a radius of curvature of said concave surface of the second meniscus lens, $r_4$ represents a radius of curvature of a surface of the second meniscus lens facing an image plane side of the photographic lens, $r_1$ represents a paraxial radius of curvature of said convex surface of the first meniscus lens, $d_1$ represents a width along the optical axis of the first meniscus lens and $v_1$ represents an Abbe's number of the first meniscus lens.

5. A photographic lens for use in a camera having an image plane, the photographic lens comprising:

(a) a first meniscus lens having a positive refracting power and a convex surface facing an object side of the photographic lens; and (b) a second meniscus lens having a positive refracting power and a concave surface facing the object side of the photographic lens, the second meniscus lens being farther from the object side of the photographic lens than the first meniscus lens, wherein the following conditions are satisfied: .

$0.50 < f/f_1 < 0.90$ $-8 < (r_4+r_3)/(r_4-r_3) < -1.5$ (8)

$0.002 < (r_1 \cdot d_1)/(f \cdot f_1) < 0.008$ $v_1 > 55$ and wherein f represents a focal length of the photographic lens, $f_1$ represents a focal length of the first meniscus lens, $r_3$ represents a radius of curvature of said concave surface of the second meniscus lens, $r_4$ represents a radius of curvature of a surface of the second meniscus lens facing an image plane side of the photographic lens, $r_1$ represents a paraxial radius of curvature of said convex surface of the first meniscus lens, $d_1$ represents a thickness of the first meniscus lens along an optical axis of the photographic lens, and $v_1$ represents an Abbe's number of the first meniscus lens.

6. The photographic lens of claim 5, wherein at least one surface of said first meniscus lens is aspherical and has a decreasing refracting power as the aspherical surface extends from the optical axis of the photographic lens.

7. The photographic lens of claim 6, wherein the following condition is satisfied:

$0.003 < (r_1 \cdot d_1)/(f \cdot f_1) < 0.004$.

8. The photographic lens of claim 5, wherein the photographic lens is used in a fixed-focus camera, and the following conditions are satisfied:

$f^2/F < 120$ $0.5 < Y_{MAX}/f < 0.87$ and wherein F represents an F-number and $Y_{MAX}$ represents a maximum image height of the fixed-focus camera.

9. A photographic lens for use in a camera including an image plane having a surface curved so that the image plane approaches an object side of the photographic lens as the image plane extends in a longitudinal direction from an optical axis of the photographic lens, the photographic lens comprising:

(a) a first meniscus lens having a positive refracting power and a convex surface facing the object side; and (b) a second meniscus lens having a positive refracting power and a concave surface facing the object side of the photographic lens, the second meniscus lens being farther from the object side of the photographic lens than the first meniscus lens, wherein the following conditions are satisfied:

$0.24 < f/f_1 < 0.90$ $-8 < (r_4+r_3)/(r_4-r_3) < -0.5$ $0.003 < (r_1 \cdot d_1)/(f \cdot f_1) < 0.004$ $v_1 > 55$ and wherein f represents a focal length of the photographic lens, $f_1$ represents a focal length of the first meniscus lens, $r_3$ represents a radius of curvature of said concave surface of the second meniscus lens, $r_4$ represents a radius of curvature of a surface of the second meniscus lens facing an image plane side of the photographic lens, $r_1$ represents a paraxial radius of curvature of said convex surface of the first meniscus lens, $d_1$ represents a thickness along the optical axis of the first meniscus lens, and $v_1$ represents an Abbe's number of the first meniscus lens.

* * * * *

UNITED STATES PATENT AND TRADEMARK OFFICE
CERTIFICATE OF CORRECTION

PATENT NO. : 5,631,777
DATED : May 20, 1997
INVENTOR(S) : Nobuyoshi MORI

It is certified that error appears in the above-indentified patent and that said Letters Patent is hereby corrected as shown below:

Claim 5, column 10, line 1, delete "(8)"

Claim 5, column 10, line 8, "$r_1$" should read --$r_3$--.

Signed and Sealed this

Second Day of June, 1998

Attest:

Attesting Officer

BRUCE LEHMAN

Commissioner of Patents and Trademarks